(No Model.)
D. CAMPBELL.
REEL.
No. 426,434. Patented Apr. 29, 1890.
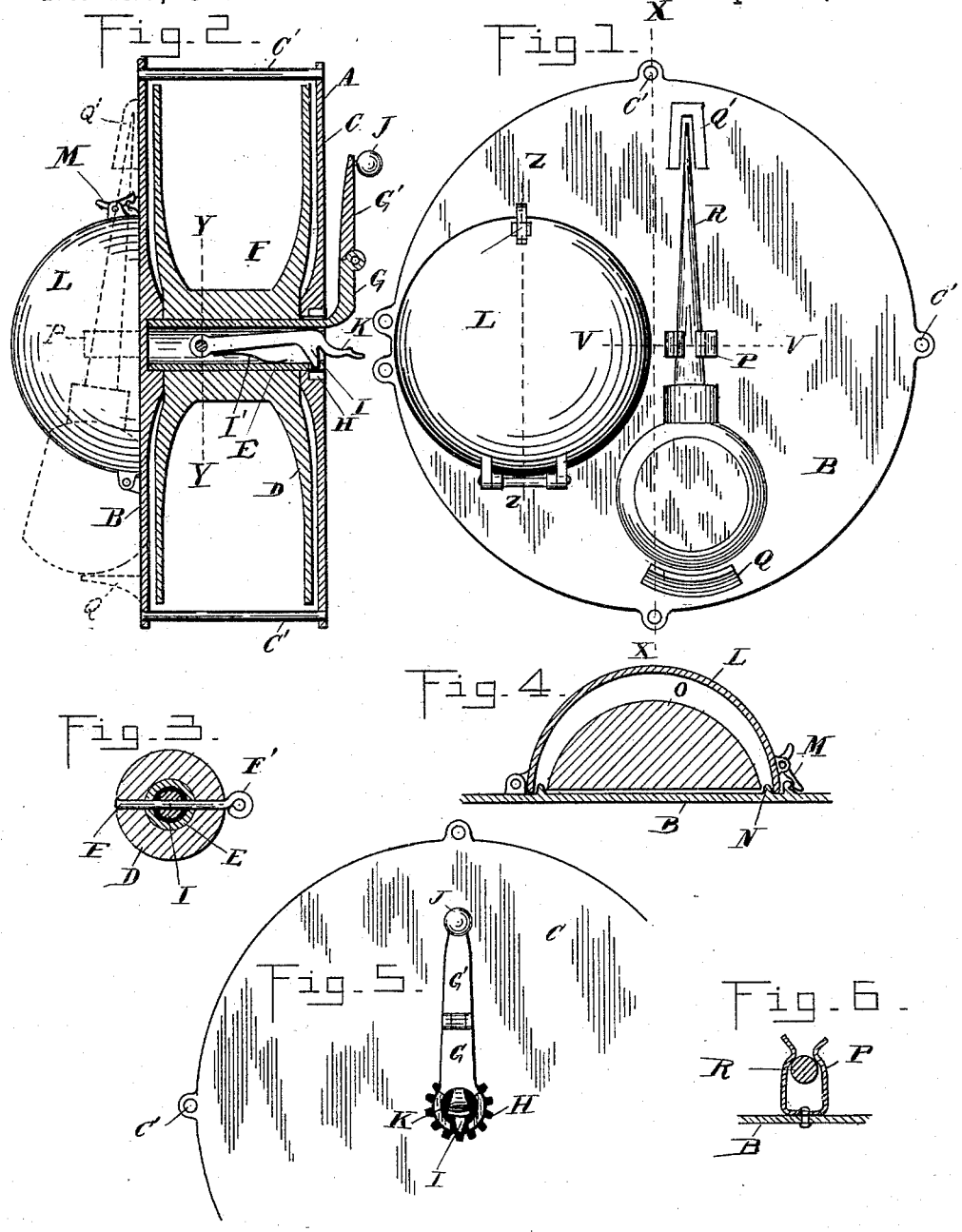
Witnesses:
Geo. A. Gregg
P. M. Hulbert
Inventor
David Campbell
By James Whittemore
Atty

UNITED STATES PATENT OFFICE.

DAVID CAMPBELL, OF WINDSOR, ONTARIO, CANADA.

REEL.

SPECIFICATION forming part of Letters Patent No. 426,434, dated April 29, 1890.

Application filed November 19, 1889. Serial No. 330,895. (No model.)

*To all whom it may concern:*

Be it known that I, DAVID CAMPBELL, a subject of the Queen of Great Britain, residing at Windsor, in the county of Essex and Province of Ontario, have invented certain new and useful Improvements in Reels, of which the following is a specification, reference being had therein to the accompanying drawings.

This invention relates to new and useful improvements in chalk-line reels; and the invention consists in the peculiar device by which the inner winding-drum is locked to a casing or frame, and further in the peculiar construction and arrangement of the parts, whereby a cheap, efficient, and serviceable tool is produced, all as more fully hereinafter described, and shown in the accompanying drawings, in which—

Figure 1 is a side elevation of my improved reel. Fig. 2 is a vertical section therethrough on line $x\ x$ in Fig. 1. Fig. 3 is a cross-section on line $y\ y$ in Fig. 2. Fig. 4 is a section through the chalk-box on line $z\ z$ in Fig. 1. Fig. 5 is an elevation of the opposite side of the reel to that shown in Fig. 1, and Fig. 6 is a section of the spring-clip and scriber on line $v\ v$ in Fig. 1.

A is the casing or frame consisting of the disks B and C and cross-bars C'. Two of these cross-bars are preferably placed in proximity to each other to act as a guide for the line.

D is a reel or spool secured to the hollow shaft E by means of the pin F. This pin I preferably provide with a loop F', to which the inner end of the line may be attached. The shaft E is journaled in the casing, and the winding-handle G is secured to or formed on it.

H are notches formed in a circular series on the casing.

I is a dog pivotally secured within the hollow spindle E by means of the pin F, and adapted to engage with the notches H.

The handle G is provided with the hinged portion G', having the knob or boss J.

K is an inclined lip formed on the dog I, and so arranged that by folding over the hinged portion of the handle the knob J will come in contact with the said lip and will force the dog I into engagement with the notches H, locking the drum to the casing. A spring I' normally holds the dog out of engagement with the notches H.

L is a cover hinged to the casing and secured by a suitable latch M. I preferably form a circular flange N upon the casing, which, with the cover, forms a suitable receptacle for the chalk O.

P is a spring-clip secured to the casing and adapted to engage with the shank of the scriber.

Q and Q' are keepers for the scriber, the latter serving to protect the point of the scriber from injury.

What I claim as my invention is—

1. In a chalk-line reel, the combination, with the outer casing, of a winding-drum journaled in said casing and provided with a central aperture, a dog pivotally secured in said aperture, and an aperture in the casing communicating with the aperture in the winding-drum and provided with a series of notches into which the dog is adapted to engage, substantially as described.

2. In a chalk-line reel, the combination of the outer casing, the winding-drum, the hollow shaft journaled in the casing and upon which the winding-drum is secured, the dog pivotally secured in the hollow shaft, the circular series of notches formed on the casing into which the dog is adapted to engage, the spring for holding the dog normally out of engagement with said notches, and the folding handle of the drum adapted to lock the dog in position, all substantially as described.

3. In a chalk-line reel, the combination of the outer casing, the hollow shaft journaled therein and projecting at one end through an aperture in the casing, the circular series of notches formed around said aperture in the casing, the dog pivotally secured in the shaft and adapted to engage into said notches, the pin which secures the drum to the shaft and upon which the dog is pivotally secured, the spring which holds the dog normally disengaged, and the folding handle adapted to actuate the dog and lock it in the folded position of said handle, substantially as described.

In testimony whereof I affix my signature, in presence of two witnesses, this 17th day of October, 1889.

DAVID CAMPBELL.

Witnesses:
GEO. A. GREGG,
JAMES WHITTEMORE.